United States Patent Office 3,109,838
Patented Nov. 5, 1963

3,109,838
POLYMERIZATION CATALYSTS AND PROCESSES
Joseph Chatt, St. Albans, and Percy Arthur Small, Welwyn Garden City, England, assignors to Imperial Chemical Industries Limited, London, England, a corporation of Great Britain
No Drawing. Filed Jan. 19, 1959, Ser. No. 787,356
Claims priority, application Great Britain Jan. 31, 1958
2 Claims. (Cl. 260—93.7)

This invention relates to polymerization catalysts.

According to the present invention polymerization catalysts may be prepared by treating a compound of a transition metal as hereinafter defined with at least one compound of the formula $(CH_2AlX)_n$ where X is a halide or hydrocarbon radical and $n$ is an integer. The said transition metals are metals occupying any of the 4th to 10th places after the inert gases in one of the long periods of the periodic system of elements, it being understood that the rare earths occupy only one place in the periodic system, that is, a third place after an inert gas. It is believed that the catalysts produced as a result of the process of our invention are produced as a result of chemical reaction between the components treated with one another.

When X' is a halogen, compounds of the formula $(CH_2AlX')_n$ may be prepared by reacting a compound of the formula $CH_2X'_2$ with aluminum. In such a reaction, we prefer to react $CH_2Br_2$ with aluminum activated by iodine in view of the good rates of reaction and yields of $(CH_2AlX')_n$ compound obtained. The reaction may, if desired, be conducted in a medium such as an ether, particularly diethyl ether. The by-product of reaction —$AlBr_3$— may be removed by washing with an organic liquid which dissolves it but is a non-solvent for, and inert towards, the compound of formula $(CH_2AlX')_n$ such as petroleum ether, or by other suitable means. When X" is a hydrocarbon radical, compounds of the formula $(CH_2AlX'')_n$ may be obtained by reacting a compound of the formula $(CH_2AlX')_n$ with a hydrocarbon compound of a non-transition metal of groups 1, 2 or 3, e.g. a lithium, zinc or aluminum alkyl. We prefer, for economy, that the group X" in such compounds are lower alkyl groups, e.g. alkyl groups having not more than four carbon atoms.

The treatment process of the present invention is most easily conducted using a transition metal compound dissolved or in suspension in an inert liquid, e.g. a liquid hydrocarbon. Our preferred transition metals for use in our process are those occupying the 4th, 5th or 6th places after the inert gases in one of the long periods of the periodic system, particularly titanium and vanadium.

To prepare catalysts suitable for polymerizing ethylene our preferred transition metal compounds are the halides, titanium and vanadium tetrachlorides being particularly active compounds which are easily handled, being soluble and volatile, and which are inexpensive.

To prepare catalysts suitable for polymerizing propylene to isotactic polypropylene our preferred transition metal compounds are trivalent titanium halides, particularly titanium trichloride and the product obtained by treating titanium tetrachloride with aluminum as described in our copending application No. 39,342/56 since highly crystalline polypropylenes of very high isotactic content are thereby obtained. These catalysts are also very suitable for polymerizing other hydrocarbons containing a vinyl group, e.g. ethylene.

(The highly active form of $TiCl_3$ obtained by reacting $TiCl_4$ with aluminum may be conveniently prepared by heating aluminum, aluminum chloride and excess of titanium tetrachloride together at temperatures up to about 250° C., if desired in the presence of an inert diluent, e.g. a liquid hydrocarbon, and then removing the unreacted titanium tetrachloride.)

Our preferred inert liquids are liquids free from sulphur containing impurities as these tend to poison our catalysts. Our catalysts are also most active when the liquid is a hydrocarbon, particularly an aliphatic or cycloaliphatic hydrocarbon. Our preferred method for carrying out the process of our invention is either to mix or work, e.g. ball mill, a slurry of one of the said aluminum compounds with a solution or dispersion of a transition metal compound in an inert solvent.

Also according to the present invention we provide a process for the polymerization of hydrocarbons containing a vinyl group, e.g. ethylene, propylene, butadiene and isoprene, in which the hydrocarbon is brought into contact with a catalyst as hereinbefore described. We further provide a process for the polymerization of ethylene to polythenes, that is the solid polymers of ethylene, and of propylene to solid, particularly isotactic polypropylene, that is polypropylene which is at least 70% insoluble in heptane, in which propylene is brought into contact with a catalyst as hereinbefore described wherein in the compound of formula $(CH_2AlX)_n$ X is a hydrocarbon radical, preferably an alkyl group having not more than four carbon atoms. We find that the catalyst wherein the compound of formula $(CH_2AlX)_n$ in which X is a halogen will not polymerize propylene to give solid polymers.

As the aluminum compounds used in and the catalyst produced by the process of this invention are decomposed by oxygen or humidity, the process of this invention and polymerizations using the catalysts produced should be conducted in the absence of air or moisture or in the presence of only limited amounts of them.

In view of the reactive nature and colour of the catalysts of our invention it is desirable to remove these catalysts from polymeric materials produced with them. The catalysts may be decomposed by treating polymeric materials containing them with a hydroxyl containing compound, e.g. water or steam, or an alcohol, including a dry alcohol, e.g. methanol or butanol. The decomposition products may then be removed by washing the polymeric materials with for example methanol, an acid or alkaline medium as is appropriate.

Our invention is illustrated but in no way limited by the following examples.

*Example 1*

Aluminum powder (1.5 g., 0.06 gram atoms) was heated with an iodine crystal, a small amount of ether (15 ml.) containing ¼ of the total quantity used of methylene iodide (12 g. total, 0.045 mole) was added. When the reaction had started the remainder of the methylene iodide in either (85 ml.) was added over 45 minutes to the gently refluxing suspension, refluxed and stirred for a further 2¼ hours. The excess of aluminum powder (0.6 g., 0.02 gram atoms) was filtered off, the ether was then removed at 40° C. and $10^{-4}$ mm. pressure.

The residue (13.4 g.) and titanium tetrachloride (1.5 ml., 0.014 mole) were dissolved separately in toluene (80 ml. total) and then added to a Baskeville autoclave (250 ml. capacity). Ethylene was added to raise the pressure to 600 p.s.i. at 20° C. The stirred mixture was heated at 100° C. (1050 p.s.i.) for 14 hours. On working up, solid polythene (13.2 g.) was obtained (ash content 0.17%), this had a melt viscosity (190° C.) of $1.8 \times 10^5$ poises and a melting point of 132–136° C.

*Example 2*

Aluminium powder (1.5 g., 0.06 gram atoms) was heated under nitrogen with a crystal of iodine. ¼ of the total quantity of methylene bromide used (7.76 g. total, 0.04 mole) in ether (8 ml.) was added and the suspension heated for ½ hour. The remainder of the methylene bromide in ether (90 ml.) was added after one hour to the gently refluxing suspension. The reaction was continued for a further 3 hours.

The ethereal solution was filtered from the residual aluminium (1.04 g., 0.039 gram atoms). The ether was removed in vacuo and the residue (5.56 g.) was extracted 4 times with petroleum ether (50 ml. total, B.P.>120° C.). The petroleum ether insoluble material (4.08 g.) was dissolved in benzene (50 ml.) and aluminium triethyl (23.6 ml., 0.17 mole) in benzene (50 ml.) was added. The solution, which immediately lightened in colour, was heated under reflux for 3 hours. The benzene was removed by distilling off under 15 mm. pressure and the aluminium alkyls remaining were removed by heating at 75° C. at $6 \times 10^{-5}$ mm. pressure.

The residue in petroleum ether (30 ml.) was charged to a Baskeville autoclave (250 ml. capacity) together with a suspension in petroleum ether (40 ml. B.P.>120° C.) of the product obtained by refluxing aluminium with an excess of titanium tetrachloride (1.43 g., equivalent to 0.007 gram atoms titanium), removing the excess of titanium tetrachloride under vacuum and dry ball milling the residue. Propylene (80 ml.) was added. The autoclave was heated to 70° C. and stirred when rapid reaction raised the temperature to 148° C. On cooling from this temperature the autoclave was held at 75° C. for 2 hours. On working up, polypropylene (26.8 g. M.P. 30–162° C.) was obtained of which 79.5% was insoluble in ether.

*Example 3*

Aluminium powder (8.7 g., 0.322 gram atom) and methylene bromide (32.2 g., 0.185 mole) were mixed together in a flask and then left for 3 weeks. The flask was then heated at 100° C. for 3 hours by which time a feathery growth of white crystals had appeared on the upper walls of the flask. The resulting solid was broken up roughly and then milled with petroleum ether (2×150 ml., B.P.>120° C.) for 2 hours. The solid obtained was centrifuged from its suspension and redispersed in petroleum ether to give 102 mls. of suspension.

$TiCl_3$ (5 g., 0.033 mole) was dry ball milled for an hour and the solid washed into a small Baskeville autoclave (250 ml. capacity) with petroleum ether (50 ml. B.P.>120° C.). The suspension obtained above (50 ml. of the 102 ml. total) was then added followed by propylene (80 ml.). The temperature in the autoclave rose immediately to 60° C. After ¾ hour the temperature was raised to 80° C. and kept there for 14 hours (maximum pressure=300 p.s.i.). An oil (20.1 g.) was isolated on evaporation of the resulting petroleum ether.

We claim:

1. A polymerization catalyst prepared by treating titanium trichloride with a compound A having repeating units of the formula $(CH_2AlR)$ where R is an alkyl radical, said compound having been obtained by reacting an aluminium trialkyl with a compound B obtained by reacting a compound of the formula $CH_2X_2$, in which X is a halogen, with aluminum.

2. A process for the polymerization of hydrocarbons selected from the group consisting of ethylene and propylene in which the hydrocarbon is brought into contact with a polymerization catalyst as claimed in claim 1.

References Cited in the file of this patent

UNITED STATES PATENTS

| | | |
|---|---|---|
| 2,283,894 | Smith | Dec. 9, 1958 |
| 2,962,491 | Mertzweiller | Nov. 29, 1960 |

FOREIGN PATENTS

| | | |
|---|---|---|
| 538,782 | Belgium | Dec. 6, 1955 |
| 779,540 | Great Britain | July 24, 1957 |
| 781,837 | Great Britain | Aug. 28, 1957 |

OTHER REFERENCES

Thomas: Compt. rend., vol 174, pp. 464–465 (1922).